United States Patent
Fodor et al.

(10) Patent No.: US 7,317,684 B2
(45) Date of Patent: Jan. 8, 2008

(54) METHOD AND APPARATUS FOR OPTIMIZING ELASTIC FLOWS IN A MULTI-PATH NETWORK FOR A TRAFFIC DEMAND

(75) Inventors: Gábor Fodor, Hässelby (SE); Laszlo Gábor Malicskó, Budapest (HU); Michal Pióro, Warsaw (PL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1071 days.

(21) Appl. No.: 10/229,854

(22) Filed: Aug. 28, 2002

(65) Prior Publication Data

US 2003/0072327 A1    Apr. 17, 2003

Related U.S. Application Data (60) Provisional application No. 60/315,034, filed on Aug. 28, 2001.

(51) Int. Cl.
    *G01R 31/08* (2006.01)
(52) U.S. Cl. ............... 370/231; 370/237; 370/391; 370/468
(58) Field of Classification Search ............ None
    See application file for complete search history.

(56) References Cited

U.S. PATENT DOCUMENTS

| | | | |
|---|---|---|---|
| 5,872,783 A | 2/1999 | Chin | 370/392 |
| 5,917,820 A | 6/1999 | Rekhter | 370/392 |
| 6,055,561 A | 4/2000 | Feldman et al. | 709/200 |
| 6,069,889 A | 5/2000 | Feldman et al. | 370/351 |
| 6,104,715 A | 8/2000 | Basso et al. | 370/397 |
| 6,130,889 A | 10/2000 | Feldman et al. | 370/397 |
| 6,148,000 A | 11/2000 | Feldman et al. | 370/397 |
| 6,243,359 B1 * | 6/2001 | Roy et al. | 370/230 |
| 6,493,317 B1 * | 12/2002 | Ma | 370/237 |

OTHER PUBLICATIONS

Kleinberg et al., "Fairness in Routing and Load Balancing", Foundations of Computer Science, 1999. 40th Annual Symposium.*
Goel et al., "Combining Fairness with Throughput: Online Routing with Multiple Objectives", Proceedings of the thirty-second annual ACM symposium on Theory of computing, pp. 670-679.*
Chen et al., "Maxmin Fair Routing in Connection-Oriented Networks", Tech. Rep., Dept. of Com. Sci., UIUC, USA, 1998, pp. 1-18.*

(Continued)

*Primary Examiner*—Chau Nguyen
*Assistant Examiner*—Jung Park (57) ABSTRACT

The present invention provides a method for optimizing elastic flows in a multi-path network for a traffic demand by jointly determining a bandwidth for each flow in a set of flows that realize the traffic demand and an optimized path for the traffic demand by maximizing a fairness utility. The present invention can be implemented as a computer program embodied on a computer readable medium in which the functions or steps of the method are implemented as code segments. In addition, the present invention can be implemented as an apparatus that includes a processor and an interface communicably coupling the processor to the multi-path network. The processor jointly determines a bandwidth for each flow in a set of flows that realize the traffic demand and an optimized path for the traffic demand by maximizing a fairness utility.

40 Claims, 5 Drawing Sheets

OTHER PUBLICATIONS

E. Rosen, A. Viswanathan, R. Callon, "Multiprotocol Label Switching Architecture", *IEFT Request for Comments*, RFC 3031, http://www.ietf.org/rfc/rfc3031.txt, Jan. 2001.

D.O. Awduche, A. Chiu, A. Elwalid, I. Widjaja, X. Xiao, "A Framework for Internet Traffic Engineering", *IETF Draft, work in progress*, http://www.ietf.org/internet-drafts/draft-ietf-tewg-framework-05.txt, Jul. 2000.

D.O. Awduche, "MPLS and Traffic Engineering in IP Networks", *IEEE Communications Magazine*, pp. 42-47, Dec. 1999.

A. Ghanwani, B. Jamoussi, D. Fedyk. P. Ashwood-Smith, L. Li, N. Feldman, "Traffic Engineering Standards in IP Networks Using MPLS", *IEEE Communications Magazine*, pp. 49-53, Dec. 1999.

G. Swallow, "MPLS Advantages for Traffic Engineering", *IEEE Communications Magazine*, pp. 54-57, Dec. 1999.

J. Lawrence, "Designing Multiprotocol Label Switching Networks", *IEEE Communications Magazine*, pp. 134-142, Jul. 2001.

K. Kar, M. Kodialam, T.V. Lakshman, "Minimum Interference Routing of Bandwidth Guaranteed Tunnels with MPLS Traffic Engineering Applications", *IEEE Journal on Selected Areas in Communications*, pp. 2566-2579, vol. 18, No. 12, Dec. 2000.

Internet Engineering Task Force, IETF, Traffic Engineering Working Group, Working Group Charter, http://www.ietf.org/html.charters/tewg-charter.html.

F.P. Kelly, A. K. Maulloo, D. K. H. Tan, "Rate Control for Communications Networks: Shadow Prices, Proportional Fairness and Stability", *Journal of the Operational Research Society*, (49), pp. 237-252, Mar. 1998.

Q. Ma, P. Steenkiste, H. Zhang, "Routing High-bandwidth Traffic in Max-min Fair Share Networks", *SIGCOMM '97*, pp. 206-217, Aug. 1997.

L. Massoulie, J. W. Roberts, "Bandwidth Sharing: Objectives and Algorithms", *IEEE INFOCOM '99*, Mar. 21-25, 1999.

W. K. Tsai, M. Iyer, "Constraint Precedences in Max-Min Fair Rate Allocation", *IEEE International Conference on Communication*, ICC, 2000.

Prioro, Malicsko, Fodor: "Optimal link capacity Dimensioning in Proportionally Fair Networks" Springer Link: Lecture Notes in Computer Science 2345 (LNCS 2345), 'Online! May 7, 2002, XP002238237.

* cited by examiner

METHOD AND APPARATUS FOR OPTIMIZING ELASTIC FLOWS IN A MULTI-PATH NETWORK FOR A TRAFFIC DEMAND

PRIORITY CLAIM

This patent application claims priority to U.S. provisional patent application Ser. No. 60/315,034 filed on Aug. 28, 2001.

TECHNICAL FIELD OF THE INVENTION

The present invention relates generally to the field of communications and, more particularly, to a method and apparatus for optimizing elastic flows in a multi-path network for a traffic demand.

BACKGROUND OF THE INVENTION

The Internet Engineering Task Force ("IETF") Multi-protocol Label Switching ("MPLS") working group has specified a set of standards that help provide quality of service ("QoS") for applications running over the Internet Protocol ("IP"). The MPLS technology enables IP network operators to explicitly assign a specific path to origin-destination ("O-D") pairs and to reserve resources along these paths. Because of this capability, MPLS allows network operators to exercise traffic engineering in the sense that if the amount of traffic between O-D pairs is known or can be estimated, then the paths between these O-D pairs (realized by the so called label switched paths ("LSP's") and the bandwidth of the paths can be appropriately configured.

In practice, the amount of traffic that needs to be served by the network is often known only in terms of a minimum and maximum required bandwidth rather than in terms of a single bandwidth value. For instance, many (so called elastic) applications can adaptively adjust their required bandwidth to network conditions and can operate adequately if a minimum amount of bandwidth is provided. On the other hand, many applications' quality and performance does not increase after a certain level if the network provides more than a required "maximum" bandwidth.

In recent years there have been significant advances in researching and standardizing mechanisms that are capable of providing service differentiation in multi-service networks like the Internet. While there still seems to be a wide span of the methods which aim to provide QoS differentiation between contending flows, it is widely accepted that there is a need for traffic engineering mechanisms that control the access of the different traffic classes to network bandwidth resources. In particular, there is a growing interest in devising bandwidth sharing algorithms which can cope with a high bandwidth utilization and at the same time maintain some notion of fairness, such as the maximum-minimum fairness ("MMF"), proportional-rate fairness (PRF) and minimum-delay fairness.

Different aspects of the MMF policy have been discussed in various publications, mostly in Asynchronous Transfer Mode ("ATM") Available Bit Rate ("ABR") context, since the ATM Forum adopted the MMF criterion to allocate network bandwidth for ABR connections. However, these publications do not consider the issue of path optimization in the bounded elastic environment. Moreover, these publications do not consider the problems encompassing maximization of the minimal flow combined with optimization of the paths used by the demands. For instance, these publications study the speed of convergence of MMF allocation algorithms rather than focusing on path optimization.

In addition, MMF routing using widest-shortest, shortest-widest and shortest-distance algorithms have been studied. These algorithms do not, however, aim to explicitly maximize the carried traffic and consequently the path allocation is not formulated as an optimization task. Moreover, a number of fairness notions have been discussed and associated optimization tasks have been presented for the case of unbounded flows and fixed routes.

Although the MMF allocation has been widely accepted and studied in the literature, its appropriateness can be questioned because of the relatively low bandwidth utilization. As a result, the PRF allocation is a promising alternative to the MMF allocation. According to the PRF criterion, in the unconstrained case (i.e. when no minimum or maximum bandwidth requirement is associated with the flows), the rate allocations $x_d$ are fair, if they maximize $\Sigma_d \log x_d$ under the capacity and bandwidth demand constraints. This objective may be interpreted as being to maximize the overall utility of rate allocations assuming each route has a logarithmic utility function. While the PRF allocation considers the path optimization problem, it fails to solve the problem and does not provide an efficient algorithm for path optimization when the flows are bounded.

Accordingly, there is a need for a method and apparatus for optimizing elastic flows in a multi-path network for a traffic demand.

SUMMARY OF THE INVENTION

The present invention provides a method and apparatus for optimizing elastic flows in a multi-path network for a traffic demand. More specifically, the present invention provides several algorithms for use in a MPLS network, which is expected to support many applications (including adaptive audio, video and streaming applications), that exercise routing for the LSPs and determine the bandwidth that needs to be assigned for these paths if a traffic demand matrix in terms of bandwidth between O-D pairs is given. This joint optimization, rather than separate optimization, of the LSP routes and the bandwidth for such elastic traffic is an extremely complex (so called NP hard) problem that has not been solved until now. In other words, the solution to the path and bandwidth engineering problems is to find such optimization objective functions that incorporate both these measures at the same time. Part of this solution is the recognition of the need for some fairness measure between elastic flows that prevents assigning e.g. zero bandwidth to one user flow while maximizing the bandwidth of another user flow.

The present invention provides a method for optimizing elastic flows in a multi-path network for a traffic demand by jointly determining a bandwidth for each flow in a set of flows that realize the traffic demand and an optimized path for the traffic demand by maximizing a fairness utility. The method may also include allocating the bandwidth for the traffic demand and assigning the optimal path for the traffic demand. Moreover, the traffic demand can be a specified bandwidth between one or more origin-destination pairs or a minimum bandwidth and a maximum bandwidth between one or more origin-destination pairs. In addition, the fairness utility can be a MMF utility or a PRF utility. Furthermore, the optimized path can be a single optimized path or at least two optimized paths.

All aspects of the present invention can be implemented as a computer program embodied on a computer readable medium for optimizing elastic flows in a multi-path network for a traffic demand in which the functions or steps of the method are implemented as code segments adapted to perform those functions or steps. In addition, the present invention can be implemented as an apparatus for optimizing elastic flows in a multi-path network for a traffic demand wherein the apparatus includes a processor and an interface communicably coupling the processor to the multi-path network. The processor jointly determines a bandwidth for each flow in a set of flows that realize the traffic demand and an optimized path for the traffic demand by maximizing a fairness utility.

Other features and advantages of the present invention shall be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. For example, in addition to telecommunications systems, the present invention may be applicable to other forms of communications or general data processing. Other forms of communications may include communications between networks, communications via satellite, or any form of communications not yet known to man as of the date of the present invention. The specific embodiments discussed herein are merely illustrative of specific ways to make and use the invention and do not limit the scope of the invention.

The present invention provides a method and apparatus for optimizing elastic flows in a multi-path network for a traffic demand. More specifically, the present invention provides several algorithms for use in a MPLS network, which is expected to support many applications (including adaptive audio, video and streaming applications), that exercise routing for the LSPs and determine the bandwidth that needs to be assigned for these paths if a traffic demand matrix in terms of bandwidth between O-D pairs is given. This joint optimization, rather than separate optimization, of the LSP routes and the bandwidth for such elastic traffic is an extremely complex (so called NP hard) problem that has not been solved until now. In other words, the solution to the path and bandwidth engineering problems is to find such optimization objective functions that incorporate both these measures at the same time. Part of this solution is the recognition of the need for some fairness measure between elastic flows that prevents assigning e.g. zero bandwidth to one user flow while maximizing the bandwidth of another user flow.

As a result, the present invention provides optimal path selection and bandwidth allocation algorithms for elastic flows under fairness constraints in a multi-path network for a given traffic demand. More specifically, the present invention can be used to provide Label Switched Path ("LSP") dimensioning and routing for elastic traffic in a Multi-protocol label Switched ("MPLS") Network. The traffic demands between origin-destination (O-D) pairs are characterized by a specified bandwidth requirement ("without bounds") or a minimum and a maximum bandwidth requirement ("with bounds"). These bounds are implied by typical traffic source characteristics and may also be imposed by traffic management tools to control individual/total throughput. Between each O-D pair there is a set of admissible paths through which the flows realizing the demand may be routed. In other words, a set of flows realizes a demand associated with an O-D pair, if the sum of the allocated bandwidths of these flows is at least this demand. Thus, the allocation task is not only to determine the bandwidth of each flow realizing the demands, but also to identify the specific path for each demand such that a fairness specific utility is maximized. In the maximum-minimum fairness ("MMF") case this implies the maximization of the minimum allocated bandwidth, whereas in the proportional fairness ("PRF") case it implies the maximization of a logarithmic utility function. Moreover, the present invention allows multiple paths to realize a given demand (demand-split). The present invention, therefore, provides efficient and useful algorithms that solve the respective optimization tasks associated with the MMF and PRF sharing constraints. As a result, the present invention can be used in traffic engineering of MPLS networks carrying elastic traffic.

The present invention also provides algorithms that optimize a fairness specific quantity (often known as the utility function), given that either a single flow (using a single path) or multiple flows (using a set of paths) are allowed to realize the user demands. Although the present invention can be adapted to use various fairness criteria, the MMF and the PRF criteria are described below. Path optimization under both these fairness criteria significantly increases the minimum allocated bandwidth (among all flows) without much decrease in the maximum allocated bandwidth and network utilization. It follows that path optimization increases the fairness between traffic flows by reducing the variance of the bandwidth allocated to the different flows.

When path optimization is applied using the present invention, the difference between MMF and PRF (in terms of performance measures, such as the minimum, maximum and average allocated bandwidth, and network utilization) is significantly lower than without path optimization. Finally, in terms of these performance measures, allowing multiple flows (along multiple paths) does increase the fairness among the demands, but its impact (as compared to the single optimized path case) is limited. The present invention could be adapted to optimize over all possible paths between the O-D pairs (rather than optimizing over the paths of a predefined set) or use distributed algorithms to implement the proposed path optimization algorithms.

Recent results indicate that it is meaningful to associate a minimum bandwidth requirement even with elastic traffic (and to exercise call admission control ("CAC")), because CAC algorithms in concert with QoS routing provide a means to prevent sessions, such as TCP, from excessive throughput degradation. From this perspective it is important to develop models and computational techniques that make analytical studies of the behavior of such future types of networks possible.

The problem of finding a suitable set of paths between each O-D pair and reserving bandwidth along each of these paths is formulated as an optimization task, where a utility function representing user satisfaction is to be maximized under capacity and fairness constraints. The formulation of the optimization is based on the key observation that the fair bandwidth allocation (without bounds and assuming a single pre-defined path for each O-D pair) can easily be based on a Linear Programming ("LP") sub-problem that can be solved with a computationally efficient algorithm.

Specifically, the set of demands that are to be satisfied are given and labeled with $d=1, 2, \ldots, D$. Each demand d is defined between a specific O-D pair. In the pre-defined path case there is a single path defined between each O-D pair and the allocation task is to determine the bandwidth (flow) $x_d$ assigned to each demand d. In the path optimization case, there is a set of admissible path $j=1, 2, \ldots, m(d)$ between each O-D pair that can be potentially used to realize flows of demand d. In this case the allocation task does not only imply the determination of the bandwidth of the flow $x_d$ realizing demand d, but also the identification of the specific path $j(d)$ that is used to realize demand, d. As will be described below, an interesting and practically important case of the path optimization problem arises when multiple paths are allowed to realize each demand (demand-split). This generalization can be useful in the case when the demand is associated with e.g. a Session Initiation Protocol ("SIP") session that contains multiple IP flows.

In the multi-commodity flow networks language the MMF allocation problem with fixed paths can be formulated as follows. There is a given set of demands (each demand is identified with the path between its originating and destination nodes) labeled with $d=1, 2, \ldots, D$, a given set of links labeled with $e=1, 2, \ldots, E$, and a given link-path incidence relation defined by coefficients $a_{ed}$ ($e=1, 2, \ldots, E$, $d=1, 2, \ldots, D$) such that $a_{ed}=1$ if link e belongs to path d, and 0 otherwise. The flows $x_d$ allocated to the paths satisfy the Max-Min Fairness condition if for each demand d there exists a saturated link e belonging to d such that flow $x_d$ is maximal on e (i.e. $x_{d=max}\{x_{d'}: a_{ed'}=1, d'=1, 2, \ldots, D\}$). Link e of capacity $y_e$ is saturated when $\Sigma_d a_{ed} x_d = y_e$.

The following Mixed-Integer Programming ("MIP") problem formulation shows that it is possible to express the above characterization of the MMF allocation problem as a mathematical programming (MIP) problem. Let $\delta_{de}$ ($e=1, 2, \ldots, E, d=1, 2, \ldots, D$) be a set of binary variables such that $\delta_{de}=0$ implies that e belongs to d, e is saturated and the flow $x_d$ is maximal on e. Then the flows $x_d$ ($x_d \geq 0$, $d=1, 2, \ldots, D$) satisfy the Max-Min Fairness condition if, and only if, they solve the following MIP problem.

Constraints (Eq. 1) assure that loads do not exceed link capacities, while (Eq. 2) guarantees that at least one $\delta_{de}=0$ for each path d. Further, (Eq. 3) implies that if $\delta_{de}=0$ then link e is saturated. Finally, using auxiliary variables $z_e$ ($e=1, 2, \ldots, E$), constraints (Eq. 4) and (Eq. 5) assure that $x_d$ is the maximal flow on link e if $\delta_{de}=0$.

Although the MIP problems are in general difficult to solve, the problem (1)-(5) can be solved algorithmically in a simple and effective way. Probably the simplest way to achieve this is given by the following algorithm. When the algorithm terminates, the resulting flows $x_d$ satisfy the MMF requirement.

$$\sum_d a_{ed} x_d \leq y_e \quad e = 1, 2, \ldots, E \tag{Eq. 1}$$

$$\sum_e a_{ed}(1 - \delta_{de}) \geq 1 \quad d = 1, 2, \ldots, D \tag{Eq. 2}$$

$$\delta_{ed} y_e \geq y_e - \sum_{d'} a_{ed'} x_{d'} \quad d = 1, 2, \ldots, D; \tag{Eq. 3}$$

$$e = 1, 2, \ldots, E; a_{ed} = 1$$

$$\delta_{ed} y_e \geq z_e - x_d d 1, 2, \ldots, D; e=1, 2, \ldots, E; a_{ed}=1. \tag{Eq 4}$$

$$x_d \leq z_e \, d=1, 2, \ldots, D; e=1, 2 \ldots, E; a_{ed}=1. \tag{Eq. 5}$$

Accordingly, the following algorithm can be used to solve MMF without bounds and with fixed paths ("MMF/NB/FP"):

Step 1: $x_d := 0$ for $d=1, 2, \ldots, D$.
Step 2: tmax=min $\{y_e/(\Sigma_d a_{ed})\}$: $e=1, 2, \ldots, E$.
Step 3: $y_e := y_e - t_{max} \Sigma_d a_{ed}$ for $e=1, 2, \ldots, E$.
   $x_d := x_d + t_{max}$ for $d=1, 2, \ldots, D$.
   Remove all saturated links e (with $y_e=0$) and all paths (demands) d that use the removed links ($a_{ed}=1$).
Step 4: If there are no demands left then stop, otherwise go to Step2.

Note that $t_{max}$ calculated in Step 2 of MMF/NB/FP is the solution of the following LP task (hereinafter referred to as "LP1"):.

indices: d = 1, 2, . . . , D demands
e = 1, 2, . . . , E links
constants: $a_{ed}$ = 1 if e belongs to the path realizing demand d, 0 otherwise
$y_e$ capacity of link e
$c_d$ weight of demand d
variables: t auxiliary variable (continuous)
objective: maximize C = t (Eq. 6)
constraints: $t \Sigma_d c_d a_{ed} \leq y_e$ $e = 1, 2, \ldots, E$ (Eq. 7)
$t \geq 0$. (Eq. 8)

The solution of LP1 is trivial: $t_{max}=\min\{y_e/(\Sigma_d c_d a_{ed}): e=1, 2, \ldots, E\}$. Hence, as mentioned above, the value of the $t_{max}$ in MMF/NB/FP is indeed the solution of the LP1 (for $c_d=1$).

The considered MMF problem can be extended to the case when demands are weighted with coefficients $Cd \geq 1$ (d=1, 2, ..., D) i.e. when some demands can be more valuable than others and this should be taken into account in the fairness definition. Such an extended problem is solved with almost the same algorithm as the one for NIW/NB/FP.

The MMF can be extended to handle bandwidth bounds (still assuming fixed and predefined paths). Note that the inclusion of the bandwidth bounds is important, because it easily allows the handling of the rigid traffic demands. An extension of MMF is obtained by introducing lower and upper bounds for the demands' flow allocation:

$$h_d \leq x_d \leq H_d \quad d=1, 2, \ldots, D. \tag{Eq. 9}$$

The corresponding algorithm for solving MMF with bounds and with fixed paths ("MMF/B/FP") is as follows:

Step 1: $y_e := y_e - \Sigma_d a_{ed} h_d$ for $e=1, 2, \ldots, E$. $x_d := h_d$ for $d=1, 2, \ldots, D$.
Remove all saturated links and all demands that use the removed links.

Step 2: Solve LP1 to obtain $t_{max}$

Step 3: $y_e := y_e - t_{max} \Sigma_d c_d a_{ed}$ for $e=1, 2, \ldots, E$.
$x_d := x_d + c_d t_{max}$ for $d=1, 2, \ldots, D$.
Remove all saturated links and all demands that use the removed links.

Step 4: If there are no demands left then stop, otherwise go to Step 2.

Note that the upper bound is taken into account in the problem preprocessing by introducing an auxiliary leaf node $v_d$ for each demand d, then by adding an extra link of capacity $H_d$ from the end node of the path realizing demand d to node $v_d$, and finally by adding this link to the considered path. As before, when the algorithm terminates, the resulting $x_d$ ($d=1, 2, \ldots, D$) is the assumed fair flow realizing demand d on its path.

The MMF concept of fairness has been criticized because it treats the demands that use long paths equal to those that use short ones, leading to a decrease in the total network throughput. To overcome this difficulty, the PRF concept has been proposed. The PRF allocation problem is specified as the following convex programming problem (hereinafter referred to as "CP1").

| | | |
|---|---|---|
| variables: | $x_d$ | flow realizing demand d |
| objective: | maximize $C = \Sigma_d c_d \log x_d$ | (Eq. 10) |
| constraints: | (Eq. 9) and | |
| | $\Sigma_d a_{ed} x_d \leq y_e$ $\quad e = 1, 2, \ldots, E$. | (Eq. 11) |

As a convex problem, CP1 has no local minima and can be solved through a multi-variable function optimization procedure with linear constraints. A more efficient method is to solve the dual problem to CP1.

A more efficient approach to the PRF allocation problem than solving the dual of CP1 is based on the piece-wise approximation of the logarithmic function hereinafter referred to as "PRF/FP".

| | | |
|---|---|---|
| variables: | $x_d$ | flow realizing demand d |
| | $f_d$ | non-negative continuous auxiliary variable associated with d |
| objective: | maximize $C = \Sigma_d c_d f_d$ | (Eq. 12) |
| constraints: | $f_d \leq b_k x_d + g_k$ $\quad d = 1, 2, \ldots, D;$ | (Eq. 13) |
| | $k = 1, 2, \ldots, K$. | |

The use of the LP formulation for the PRF allocation problem is advantageous because commercial LP solvers can effectively solve it and because it can be easily extended to the path optimization case. It is important that the approximation used in PRF/LP is not limiting since even with small value of K the approximation is practically not worse than the original logarithmic function.

A natural question arises as to how to define and solve fair bandwidth allocation problems when the paths used for realizing the demands are also optimized (in some sense) as opposed to the fixed (given) set of paths described above. The following discussion will deal with this type of fair allocation problem.

Consider the following, path-dependent version of task LP1 hereinafter referred to as "LP2" (MMF with multiple paths):

| | | |
|---|---|---|
| indices: | $d = 1, 2, \ldots, D$ | demands |
| | $j = 1, 2, \ldots, m(d)$ | paths that can potentially realize demand d |
| | $e = 1, 2, \ldots, E$ | links |
| constants: | $a_{edj} = 1$ if e belongs to the path j realizing demand d, 0 otherwise | |
| | $y_e$ | capacity of link e |
| | $c_d$ | weight of demand d |
| variables: | $x_{dj}$ | flow allocated to path j realizing demand d (non-negative continuous) |
| | t | auxiliary variable (continuous) |
| objective: | maximize $C = t$ | (Eq. 14) |
| constraints: | $\Sigma_j x_{dj} = c_d \cdot t$ $\quad d = 1, 2, \ldots, D$ | (Eq. 15) |
| | $\Sigma_d \Sigma_j a_{edj} x_{dj} \leq y_e$ $\quad e = 1, 2, \ldots, E$ | (Eq. 16) |
| | $t \geq 0.$ | (Eq. 17) |

LP2 allows for multiple flows realizing the demands and is a Linear Program.

Algorithm for solving MMF without bounds and optimized paths ("MMF/NB/OP"):

Step 1: $X_d := 0$ for $d=1, 2, \ldots, D$.;
$x_{dj} := 0$ for $d=1, 2, \ldots, D, j=1, 2, \ldots, m(d)$.

Step 2: Solve LP2 to obtain optimal flows $x_{dj}^0$ ($d=1, 2, \ldots, D, j=1, 2, \ldots, m(d)$).

Step 3: $y_e := y_e - \Sigma_d \Sigma_j a_{edj} x_{dj}^0$ for $e=1, 2, \ldots, E$.
$X_d := X_d + \Sigma_j x_{dj}^0$ for $d=1, 2, \ldots, D$.
$x_{dj} := x_{dj} + x_{dj}^0$ for $d=1, 2, \ldots, D, j=1, 2, \ldots, m(d)$.
Remove all saturated links and all demands that use the removed links.
Remove all demands with empty lists of available paths.

Step 4: If there are no demands left then stop, otherwise go to Step 2.

When the above algorithm determines, $X_d$ returns the total flow allocated to demand d, and $x_{dj}$ returns the allocation of its individual flows (i.e. per path). Unfortunately, such an extension of the fixed path case is not entirely correct. In the MMF problems with fixed paths the obtained solution at each step of the iterative algorithms (cf. MMF/NB/FP) is unique. This property in fact makes the MMF notation straightforward in the case when the paths are fixed. When the paths are subject to optimization, however, this is no longer true and the issue is that the optimal solutions of LP2 are in general not unique. This means that we can have more than one flow vector $x^0 = (x_{dj}^0, d=1, 2, \ldots, D; j=1, 2, \ldots, m(d)$ that maximize the value of t in (14). Consequently, the choice of the optimal solution $x^0$ in Step 2 may influence the further development of the algorithm and its final result.

Hence, the notion of MMF becomes less clear in the case of flexible (optimized) paths. The MMF solution can also be characterized in the following way: if the realized demands are ordered according to their increasing values then the resulting vector is lexicographically as great as possible. Unfortunately, this nice characterization is not easily exploited, primarily because there is not an efficient way to determine MMF solutions in this sense. Another problem is that even if an MMF solution could be found, the solution might not maximize the throughput. To overcome this difficulty, the following procedure can be used. First, solve LP2 to obtain the maximum t ($t_{max}$). Next, solve the following LP3 (throughput maximization) task maximizing the network throughput assuring that each demand is assigned at least $t_{max}$ bandwidth.

| | | |
|---|---|---|
| indices: | $d = 1, 2, \ldots, D$ | demands |
| | $j = 1, 2, \ldots, m$ (d) | paths that can potentially realize demand d |
| | $e = 1, 2, \ldots, E$ | links |
| constants: | $a_{edj} = 1$ if e belongs to the path j realizing demand d, 0 otherwise | |
| | $y_e$ | capacity of link e |
| | $c_d$ | weight of demand d |
| | $t_{max}$ | lower bound for demand realization |
| variables: | $x_{dj}$ | flow allocated to path j realizing demand d |
| objective: | maximize $C = \Sigma_d c d \Sigma_j x_{dj}$ | (Eq. 18) |
| constraints: | $\Sigma_j x_{dj} \geq t_{max}$  $\quad d = 1, 2, \ldots, D$ | (Eq. 19) |
| | $\Sigma_d \Sigma_j a_{edj} x_{dj} \leq y_e$  $\quad e = 1, 2, \ldots, E$. | (Eq. 20) |

The above approach may seem a bit "brute force", as solving LP3 it is not totally fair.

When optimizing the paths, it is reasonable to assume that the entire flow of each demand is realized over one of the possible alternative paths. The following Mixed-Integer Programming task solves the first stage of the MMF problem with single paths hereinafter referred to as "MIP1" (MMF with single paths):

| | | |
|---|---|---|
| additional constant: | M | Large number |
| additional variables: | $\epsilon_{dj}$ | binary variable indicating which path is chosen to carry demand |
| objective: | maximize (Eq. 14) | |
| constraints: | (Eq. 15), (Eq. 16), (Eq. 17) and | |
| | $\Sigma_j \epsilon_{dj} = 1$  $\quad d = 1, 2, \ldots, D$, | (Eq. 21) |
| | $x_{dj} \leq M \epsilon_{dj}$  $\quad d = 1, 2, \ldots, D$, $j = 1, 2, \ldots, m$ (d). | (Eq. 22) |

After the MIP1 task is solved, the paths that result from the optimal solution can be fixed, and the solution can proceed just like in the case of MMF/NB/FP. As in the multiple path case, the notion of the maximum lexicographical order could be used. This time, however, it is known that even in the special case of the single source, the MMF solution does not in general maximize the throughput. The MIP formulation above constitutes the basis of the following algorithm for solving MMF without bounds and optimized single paths ("MMF/NB/OSP"):

Step 1: $X_d := 0$ for $d=1, 2, \ldots, D$;
$x_{dj} := 0$ for $d=1, 2, \ldots, D, j=1, 2, \ldots, m(d)$.

Step 2: Solve MIP1 to obtain optimal flows
$x_{dj}^0$ ($d=1, 2, \ldots, D, j=1\ 2, \ldots, m(d)$).

Step 3: Let $A \subset \{1, 2, \ldots, D\}$ be the set of indices such that $d \in A$ if the path realizing demand d contains a saturated link e (i.e. $y_e =$)

Put $y_e := y_e - \Sigma_d A \Sigma_j a_{edj} x_{dj}^0$ for $e=1, 2, \ldots, E$.
For all $d \in A$ put $X_d := X_d + \Sigma_j a_{edj} x_{dj}^0$ and $x_{dj} := x_{dj} + x_{dj}^0$ for $j=1, 2, \ldots, m(d)$.

Remove from the network all saturated links and all demands from A.

Step 4: If there are no demands left then stop, otherwise go to Step 2.

Note that in Step 3 of the above algorithm the network is modified only with respect to the flows that use the removed saturated links (only the capacity used by these flows is subtracted from the links).

The MMF allocation problem with bounds (Eq. 9) and paths' optimization is solved by slightly modifying the algorithms MMF/NB/OP or MMF/NB/OSP. For this first algorithm the modification results in the algorithm called MMF/B/OP that works as follows: during the first (and only the first) execution of Step 2, constraint (Eq. 15) in task LP2 is substituted with $$\Sigma_j x_{dj} = h_d + c_d t \; d=1, 2, \ldots, D \qquad (Eq.\ 23)$$

Similarly, MMF/B/OSP is obtained with the same modification (constraint (Eq. 15) substituted with (Eq. 23)) from MMF/NB/OSP. This time, however, in Step 2 the modified task is used in all cases. Of course, in both cases the auxiliary links with capacity $H_d$ are added to the network.

Task PRF/LP formulated above can be easily adapted to the PRF allocation problem with path optimization hereinafter referred to as ("PRF/OP") or PRF with Optimized Multiple Paths:

| | | |
|---|---|---|
| variables: | $x_{dj}$ flow allocated to path j realizing demand d | |
| | $f_d$ non-negative continuous auxiliary variable associated with d | |
| objective: | maximize $C = \Sigma_d c_d f_d$ | (Eq. 24) |
| constraints: | $h_d \leq \Sigma_j x_{dj} \leq H_d$  $\quad d = 1, 2, \ldots, D$ | (Eq. 25) |
| | $\Sigma_d \Sigma_j a_{edj} x_{dj} \leq y_e$,  $\quad e = 1, 2, \ldots, E$ | (Eq. 26) |
| | $f_d \leq bk \Sigma_j x_{dj} + g_k$  $\quad d = 1, 2, \ldots, D,$ $k: = 1, 2, \ldots, K$. | (Eq. 27) |

Similarly, the PRF allocation problem with single paths' optimization is as follows hereinafter referred to as "PRF/OSP" or PRF with Optimized Single Path:

| | | |
|---|---|---|
| variables: | $\epsilon_{dj}$ binary variable indicating which path is chosen to carry demand d | |
| | $x_{dj}$ flow allocated to path j realizing demand d | |
| | $f_d$ non-negative continuous auxiliary variable associated with d | |
| objective: | maximize (Eq. 24) | (Eq. 28) |
| constraints: | (Eq. 21), (Eq. 22), (Eq. 25), (Eq. 26), (Eq. 27). | |

As will be appreciated by those skilled in the art, the various embodiments of the present invention (MMF/NB/OP, MMF/NB/OSP, MMF/B/OP, MMF/B/OSP, PRF/OP and PRF/OSP) can be characterized by a method for optimizing elastic flows in a multi-path network for a traffic demand by jointly determining a bandwidth for each flow in a set of flows that realize the traffic demand and an optimized path for the traffic demand by maximizing a fairness utility. The method may also include allocating the bandwidth for the traffic demand and assigning the optimal path for the traffic demand. As previously described, the traffic demand can be a specified bandwidth between one or more origin-destination pairs or a minimum bandwidth and a maximum bandwidth between one or more origin-destination pairs. In addition, the fairness utility can be a MMF utility or a PRF utility. Moreover, the optimized path can be a single optimized path or at least two optimized paths.

All aspects of the present invention can be implemented as a computer program embodied on a computer readable medium for optimizing elastic flows in a multi-path network for a traffic demand in which the functions or steps of the method are implemented as code segments adapted to perform those functions or steps. In addition, the present invention can be implemented as an apparatus for optimizing elastic flows in a multi-path network for a traffic demand wherein the apparatus includes a processor and an interface communicably coupling the processor the to the multi-path network. The processor jointly determines a bandwidth for each flow in a set of flows that realize the traffic demand and an optimized path for the traffic demand by maximizing a fairness utility.

Figure 1:
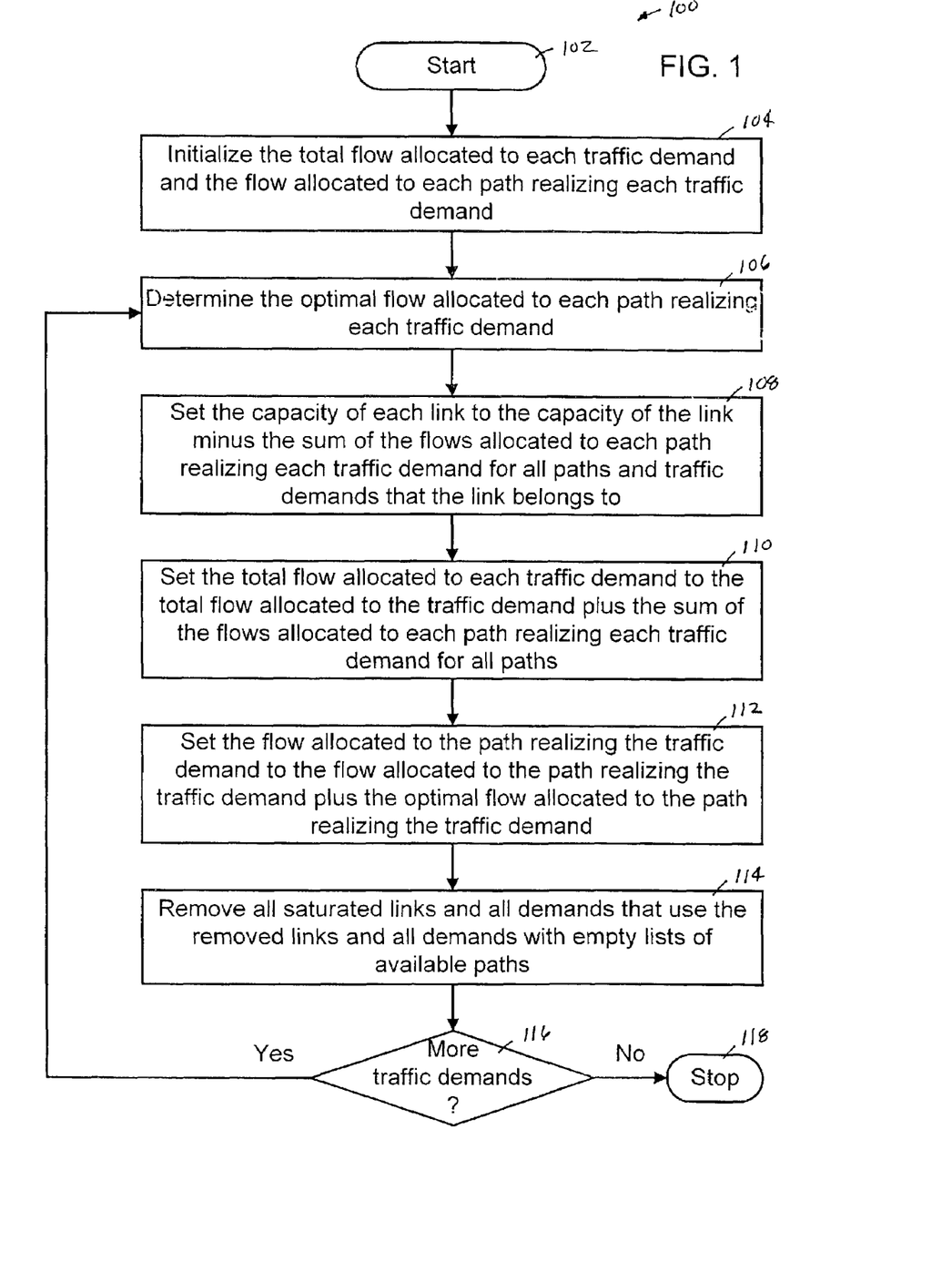
FIG. 1 is a flow chart illustrating an algorithm for solving MMF without bounds and optimized multiple paths ("MMF/NB/OP") in accordance with one embodiment of the present invention.

More specifically, FIG. 1 is a flow chart illustrating an algorithm 100 for solving MMF without bounds and optimized multiple paths ("MMF/NB/OP") in accordance with one embodiment of the present invention. The algorithm 100, which one implementation of the method described above, begins at block 102 and the total flow allocated to each traffic demand and the flow allocated to each path realizing each traffic demand are initialized in block 104. The optimal flow allocated to each path realizing each traffic demand is determined in block 106. This determination can be performed using LP2 or LP2 followed by LP3. The capacity of each link is set to the capacity of the link minus the sum of the flows allocated to each path realizing each traffic demand for all paths and traffic demands that the link belongs to in block 108. Each total flow allocated to each traffic demand is set to a total flow allocated to each traffic demand plus a sum of the flows allocated to each path realizing each traffic demand for all paths in block 110. Each flow allocated to the path realizing the traffic demand is set to the flow allocated to the path realizing the traffic demand plus the optimal flow allocated to the path realizing the traffic demand in block 112. All saturated links and traffic demands that use the removed links and all demands with empty lists of available paths are removed in block 114. If there are no more traffic demands, as determined in decision block 116, the process ends in block 118. If, however, there are more traffic demands, the process loops back to block 106 and the process is repeated until there are no more traffic demands.

Figure 2:
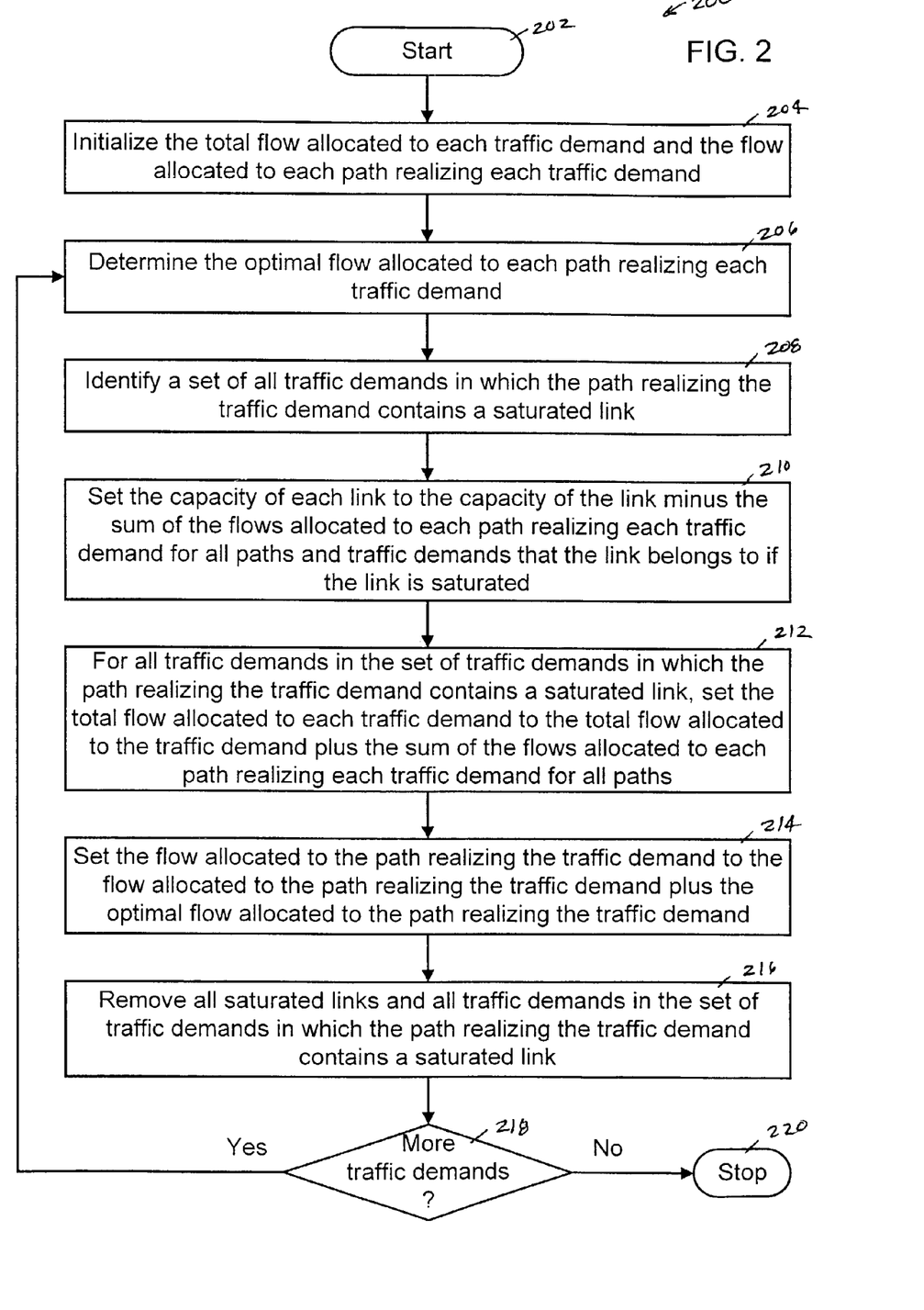
FIG. 2 is a flow chart illustrating an algorithm for solving MMF without bounds and optimized single paths ("MMF/NB/OSP") in accordance with another embodiment of the present invention.

Similarly, FIG. 2 is a flow chart illustrating an algorithm 200 for solving MMF without bounds and optimized single paths ("MMF/NB/OSP") in accordance with another embodiment of the present invention. The algorithm 100, which one implementation of the method described above, begins at block 204 and the total flow allocated to each traffic demand and the flow allocated to each path realizing each traffic demand are initialized in block 204. The optimal flow allocated to each path realizing each traffic demand is determined in block 206. This determination can be performed using MIP1. A set of all traffic demands in which the path realizing the traffic demand is a saturated link is identified in block 208. A capacity of each link is set to the capacity of the link minus the sum of the flows allocated to each path realizing each traffic demand for all paths and traffic demands that the link belongs to if the link is saturated in block 210. For all traffic demands in the set of traffic demands in which the path realizing the traffic demand contains a saturated link, each total flow allocated to each traffic demand is set to a total flow allocated to each traffic demand plus a sum of the flows allocated to each path realizing each traffic demand for all paths in block 212. Each flow allocated to the path realizing the traffic demand is set to the flow allocated to the path realizing the traffic demand plus the optimal flow allocated to the path realizing the traffic demand in block 214. All saturated links and traffic demands in the set of traffic demands in which the path realizing the traffic demand contains a saturated link are removed in block 216. If there are no more traffic demands, as determined in decision block 218, the process ends in block 220. If, however, there are more traffic demands, the process loops back to block 206 and the process is repeated until there are no more traffic demands.

A simplified model of the Polish backbone network will be considered and the impact of path optimization on relevant performance measures will be investigated. Except for on section below, the unbounded MMF and PPF allocation methods will be examined comparing utilization, average bandwidth and the variance of the allocated bandwidth under these two schemes. The 3 path selection algorithms will be used: fixed path ("FP"), optimized single path ("OSP") and optimized (multiple) path ("OP").

This example network contains 12 nodes and 18 links, with user demands between each pair of nodes, resulting in a total of D=66 demands. Each user demand can be carried by several (varying between 6 and 13) alternative paths. To obtain results with relevant statistical confidence, the bandwidth sharing algorithms detailed beforehand were applied for the same network topology for a number of times, with link capacities set randomly in the consecutive experimental calculations, but preserving the same fixed overall available network bandwidth. In all cases the demands have been assigned equal weights, setting $c_d$=1, d=1, 2, . . . D.

The random link capacity values of the studied network topology were established using the following algorithm for each setup. First 1-1 random numbers are generated in the interval [0,1] and the random numbers are sorted in increasing order, partitioning the [0,1] interval into "1" random length sections. Each of these sections is associated to a link and the according link capacity is obtained by multiplying the length of the section with the targeted (overall available network capacity (360 bandwidth units in the present case). In order to avoid inaccuracies and the possibility of including extremely low bandwidth links, the results are rounded to integer values (>1) and adjusted to preserve the same total network bandwidth.

To highlight the benefits of path optimization, in the first experiment the shortest (in the sense of number of links involved) path method was used to choose between the alternative routes to carry user demands. After selecting the paths, the corresponding MMF and PRF allocations were calculated. In the case of MMF, the LP1 formulation together with the MMF/NB/FP algorithm was applied, while the PRF shares were calculated with PRF/FP.

In the case of flexible (multiple) paths, the multiple route shares are given by MMF/NB/OP and PRF/OP. The numerical examples for the single route scenario were laborated using MMF/NB/OSP and PRF/OSP.

Figure 3:
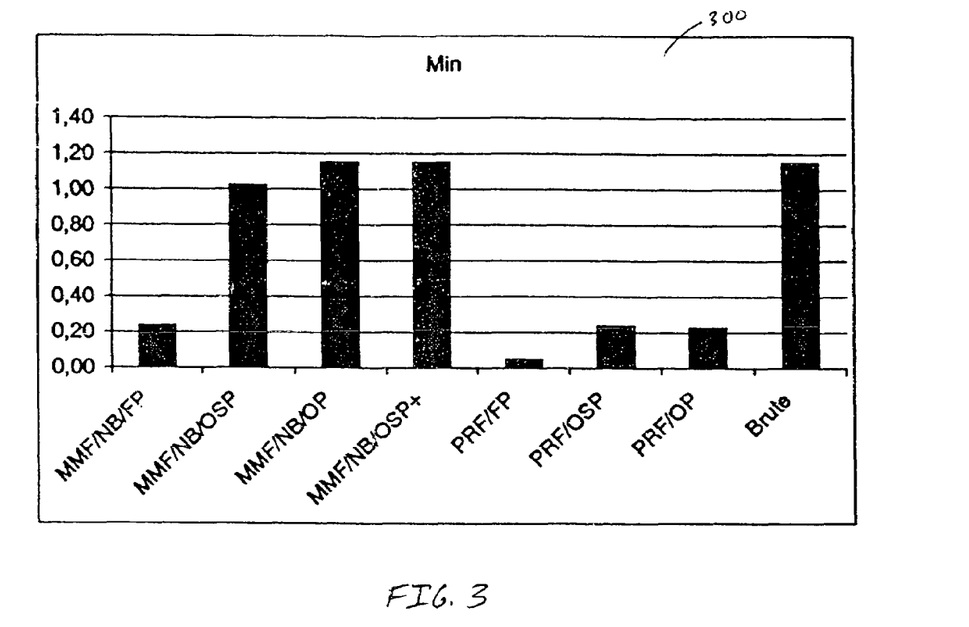
FIG. 3 is a bar graph of the minimum allocated bandwidth for various path optimizations in accordance with the prior art and several embodiments of the present invention.
Figure 4:
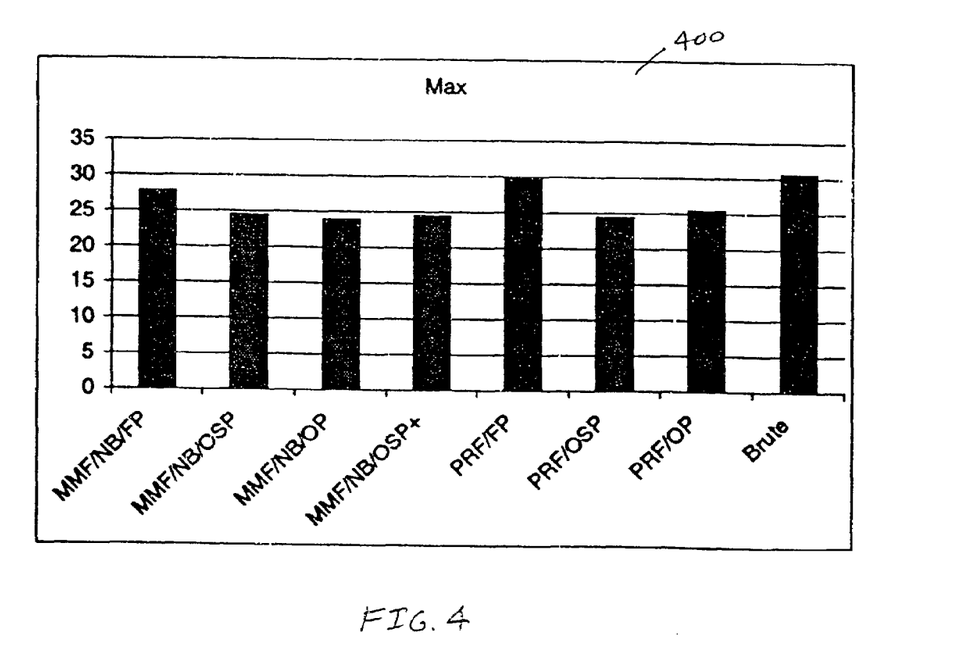
FIG. 4 is a bar graph of the maximum allocated bandwidth for various path optimizations in accordance with the prior art and several embodiments of the present invention.

The impact of path optimization is illustrated in FIGS. 3 and 4 that show the minimum allocated bandwidth 300 and maximum allocated bandwidth 400, respectively, for the MMF/NB/FP (prior art), MMF/NB/OSP (present invention), MMF/NB/OP (present invention), MMF/NB/OSP+ (present invention), PRF/FP (prior art), PRF/OSP (present invention), PRF/OP (present invention) and Brute (present invention). Note that the MMF allocation implies the maximization of the "smallest" flow, as it is also shown in FIG. 3.

Maximizing the minimum bandwidth results of course in smaller maximum bandwidth as compared to the PRF allocation, see the FP columns in FIG. 4.

Figure 5:
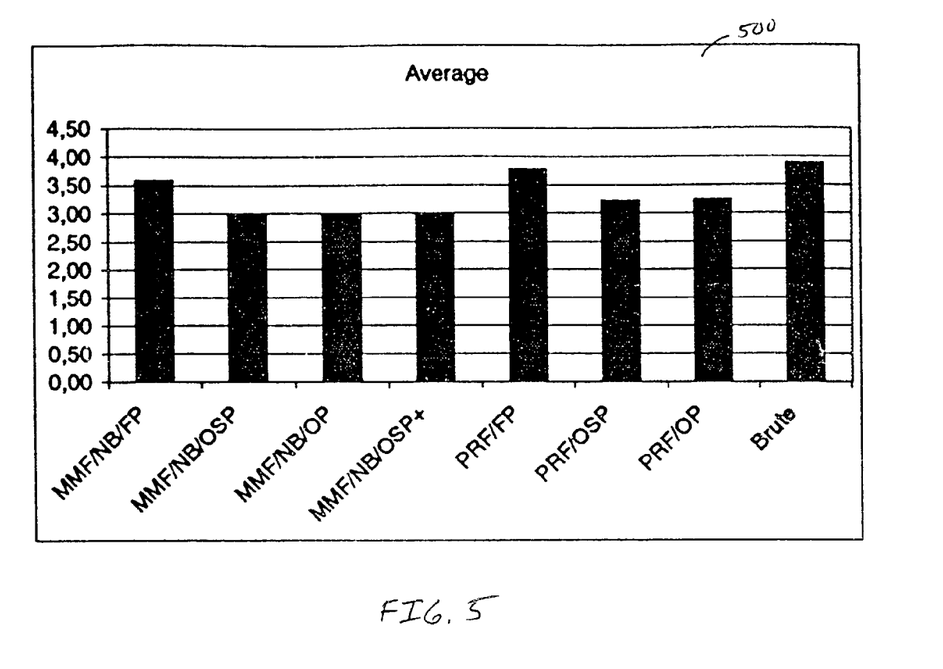
FIG. 5 is a bar graph of the average allocated bandwidth for various path optimizations in accordance with the prior art and several embodiments of the present invention.
Figure 6:
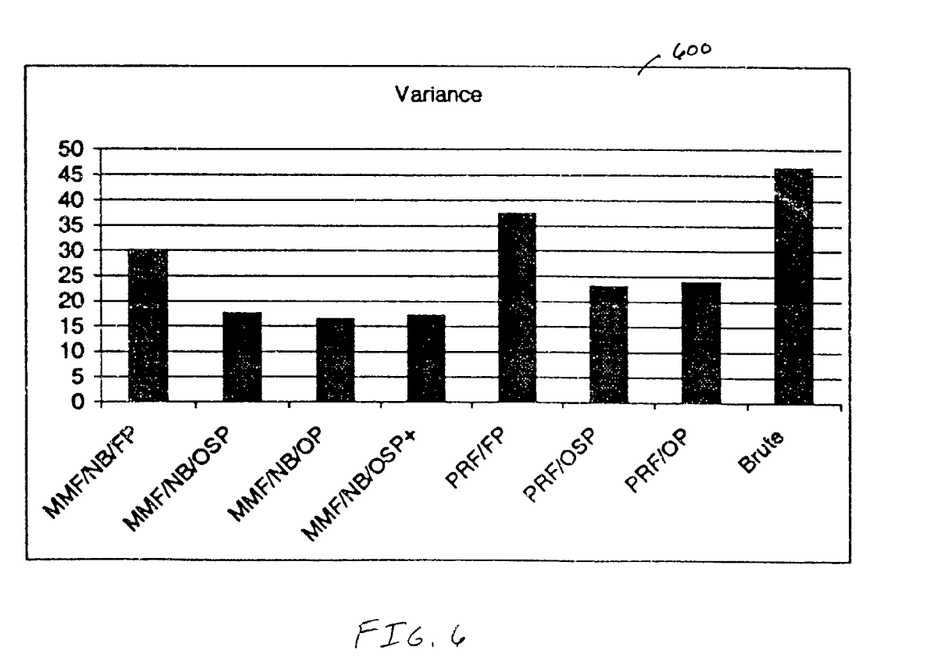
FIG. 6 is a bar graph of the level of unfairness for various path optimizations in accordance with the prior art and several embodiments of the present invention.

Optimizing a single path has a profound impact under both fairness constraints: the bandwidth of the "small" flows increases about five times without much decrease of the maximum bandwidth. Also, both the minimum and the maximum bandwidth values are roughly the same under the MMF and the PRF allocations. In other words, optimal path selection decreases the importance of the specific fairness notion. (This observation is further supported by FIG. 6, which shows the level of unfairness 600, where the variance of the allocated bandwidth decreases with optimal path selection.) FIGS. 5 and 6 also show MMF/NB/FP (prior art), MMF/NB/OSP (present invention), MMF/NB/OP (present invention), MMF/NB/OSP+ (present invention), PRF/FP (prior art), PRF/OSP (present invention), PRF/OP (present invention) and Brute (present invention).

FIG. 5 shows the average bandwidth 500 allocated over all 66 flows in the network. Again, note that while fairness does have an impact on the allocated bandwidth, in the path optimized case its relevance is smaller. (MMF normally results in smaller average bandwidth.) Note also that while path optimization is important, because it contributes to optimize the utility function of the fairness criteria, it decreases the utilization somewhat, especially under max-min fairness.

Figure 7:
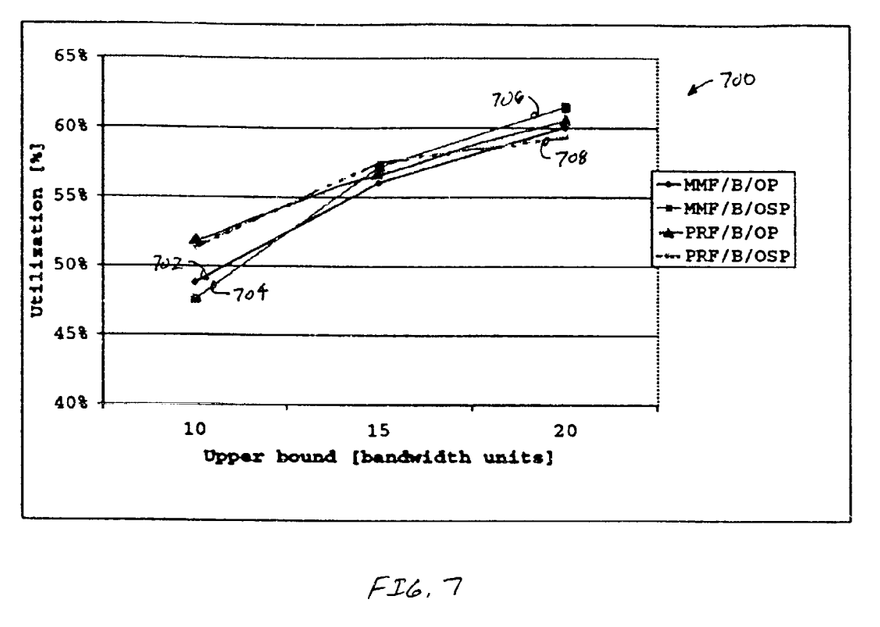
FIG. 7 is a bar graph of the network utilization for various path optimizations using upper bounds in accordance with several embodiments of the present invention.
Figure 8:
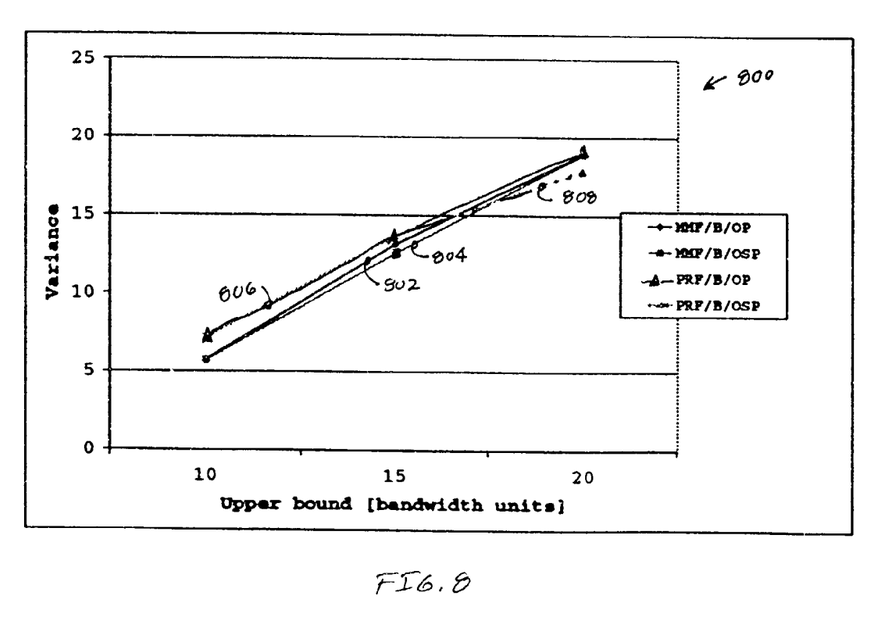
FIG. 8 is a bar graph of the variance of the allocated bandwidth for various path optimizations using upper bounds in accordance with several embodiments of the present invention.

The impact of upper-bounding the demands can be seen in FIGS. 7 and 8, which show how variance and utilization are influenced by the presence of upper bounds. FIGS. 7 and 8 show MMF/B/OP (702 and 802; present invention), MMF/B/OSP (704 and 804; present invention), PRF/OP (706 and 806; present invention) and PRF/OSP (708 and 808; present invention). As expected, the utilization increases roughly linearly with the demand's upper bound. However, the difference between the single and multiple path cases is negligible.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for optimizing elastic flows in a multi-path network for a given traffic demand, the method comprising the steps of:

jointly determining a bandwidth for each flow in a set of flows that realize the traffic demand and an optimized path for the traffic demand by maximizing a fairness utility, said step of jointly determining a bandwidth further comprising:

(a) determining an optimal flow for each path;
(b) setting the capacity of each link;
(c) setting each total flow allocated to each traffic demand to a total flow allocated to each traffic demand plus a sum of the flows allocated to each path realizing each traffic demand for all paths;
(d) setting each flow allocated to the path realizing the traffic demand to the flow allocated to the path realizing the traffic demand plus the optimal flow allocated to the path realizing the traffic demand; and
(e) removing all saturated links and traffic demands that use saturated links; thereby providing optimal path selection and bandwidth allocation for elastic flows in the multi-path network for the given traffic demand.

2. The method as recited in claim 1, further comprising the steps of:

allocating the bandwidth for the traffic demand; and
assigning the optimal path for the traffic demand.

3. The method as recited in claim 1, wherein the traffic demand is a specified bandwidth between one or more origin-destination pairs.

4. The method as recited in claim 1, wherein the traffic demand is a minimum bandwidth and a maximum bandwidth between one or more origin-destination pairs.

5. The method as recited in claim 1, wherein the fairness utility is a maximum-minimum fairness utility.

6. The method as recited in claim 1, wherein the fairness utility is a proportional fairness utility.

7. The method as recited in claim 1, wherein the optimized path is a single optimized path.

8. The method as recited in claim 1, wherein the optimized path is at least two optimized paths.

9. The method as recited in claim 1, further comprising the step of initializing a total flow allocated to each traffic demand and a flow allocated to each path realizing each traffic demand.

10. The method as recited in claim 1, wherein the demand comprises at least two traffic demands and steps (a) through (e) are performed for each traffic demand.

11. The method as recited in claim 1, wherein the step of determining an optimal flow for each path comprises solving a linear programming problem to maximize $C=t$ using constraints $\Sigma_j x_{dj} = c_d \cdot t$, $\Sigma_d \Sigma_{dj} a_{edj} x_{dj} \leq y_e$ and $t \geq 0$ wherein d is the traffic demand $(1, 2, \ldots, D)$ j is the path $(1, 2, \ldots, m(d))$ that can potentially realize demand d, e is the link $(1, 2, \ldots, E)$, $a_{edj}=1$ if e belongs to the path j realizing demand d, 0 otherwise, $y_e$ is the capacity of link e, $c_d$ is the weight of demand d, $x_{dj}$ is the flow allocated to path j realizing demand d (non-negative continuous) and t is an auxiliary variable (continuous).

12. The method as recited in claim 11, further comprising solving a linear programming problem to maximize $C=\Sigma_d c_d \Sigma_j x_{dj}$ using constraints $\Sigma_j x_{dj} \geq t_{max}$ and $\Sigma_d \Sigma_j a_{edj} x_{dj} \leq y_e$ wherein d is the traffic demand $(1, 2, \ldots, D)$, j is the path $(1, 2, \ldots, m(d))$ that can potentially realize demand d, e is the link $(1, 2, \ldots, E)$, $a_{edj}=1$ if e belongs to the path j realizing demand d, 0 otherwise, $y_e$ the capacity of link e, $c_d$ is the weight of demand d, $t_{max}$ is the lower bound for demand realization and $x_{dj}$ is the flow allocated to path j realizing demand d.

13. The method as recited in claim 11, wherein a constraint $\Sigma_j x_{dj} = h_d = c_d t$ is used instead of the constraint $\Sigma_j x_{dj} = c_d \cdot t$ during a first determination of the optimal flow wherein $h_d$ is the lower bound for the allocation to demand d and the constraint $\Sigma_j x_{dj} = c_d \cdot t$ is used during subsequent determinations of the optimal flow.

14. The method as recited in claim 1, wherein the step of jointly determining a bandwidth for each flow in a set of flows that realize the traffic demand and an optimized path for the traffic demand by maximizing a fairness utility further comprises the steps of:

(a) determining an optimal flow for each path;
(b) identifying a set of all traffic demands in which the path realizing the traffic demand is a saturated link;
(c) setting a capacity of each link to the capacity of the link minus the sum of the flows allocated to each path realizing each traffic demand for all paths and traffic demands that the link belongs to if the link is saturated;

(d) for all traffic demands in the set of traffic demands in which the path realizing the traffic demand contains a saturated link, selling each total flow allocated to each traffic demand to a total flow allocated to each traffic demand plus a sum of the flows allocated to each path realizing each traffic demand for all paths;

(e) setting each flow allocated to the path realizing the traffic demand to the flow allocated to the path realizing the traffic demand plus the optimal flow allocated to the path realizing the traffic demand; and (f) removing all saturated links and traffic demands in the set of traffic demands.

15. The method as recited in claim 14, further comprising the step of initializing a total flow allocated to each traffic demand and a flow allocated to each path realizing each traffic demand.

16. The method as recited in claim 14, wherein the demand comprises at least two traffic demands and steps (a) through (f) are performed for each traffic demand.

17. The method as recited in claim 14, wherein the step of determining an optimal flow for each path comprises solving a linear programming problem to maximize C=t using constraints $\Sigma_j x_{dj} = c_d \cdot t$ and $\Sigma_d \Sigma_j a_{edj} x_{dj} \leq y_e$ and $t \geq 0$ and $\Sigma_j \epsilon_{dj} = 1$ and $x_{dj} \leq M \epsilon_{dj}$ wherein d is the traffic demand (1, 2, ..., D), j is the path (1, 2, ..., m(d)) that can potentially realize demand d, e is the link (1, 2, ..., E), M is a large number, $a_{edj} = 1$ if e belongs to the path j realizing demand d, 0 otherwise, $y_e$ is the capacity of link e, $c_d$ is the weight of demand d, $x_{dj}$ is the flow allocated to path j realizing demand d (non-negative continuous), t is an auxiliary variable (continuous) and $\epsilon_{dj}$ is a binary variable indicating which path is chosen to carry demand d.

18. The method as recited in claim 17, wherein a constraint $\Sigma_j x_{dj} = h_d = c_{dt}$ is used instead of the constraint $\Sigma_j x_{dj} = c_d \cdot t$ wherein $h_d$ is the lower bound for the allocation to demand d.

19. The method as recited in claim 1, wherein the step of jointly determining a bandwidth for each flow in a set of flows that realize the traffic demand and an optimized path for the traffic demand by maximizing a fairness utility comprises solving a linear programming problem to maximize $C = \Sigma_d c_{dfd}$ using constraints $h_d \leq \Sigma_j x_{dj} \leq H_d$ and $\Sigma_d \Sigma_j a_{edj} x_{dj} \leq y_e$ and $f_d \leq b_k \Sigma_j x_{dj} + g_k$ wherein d is the traffic demand (1, 2, ..., D), j is the path (1, 2, ..., m(d)) that can potentially realize demand d, e is the link (1, 2, ..., E), $c_d$ is the weight of demand d, $a_{edj} = 1$ if c belongs to the path j realizing demand d, 0 otherwise, $y_e$ the capacity of link e, $c_d$ is the weight of demand d, $x_{dj}$ is the flow allocated to path j realizing demand d (non-negative continuous), $f_d$ is a non-negative continuous auxiliary variable associated with demand d, $h_d$ is the lower bound for the allocation to demand d and $H_d$ is the upper bound for the allocation to demand d.

20. The method as recited in claim 1, wherein the step of jointly determining a bandwidth for each flow in a set of flows that realize the traffic demand and an optimized path for the traffic demand by maximizing a fairness utility comprises solving a linear programming problem to maximize $C = \Sigma_d c_{dfd}$ using constraints $\Sigma_j \epsilon_{dj} = 1$ and $x_{dj} \leq M \epsilon_{dj}$ and $h_d \leq \Sigma_j x_{dj} \leq H_d$ and $\Sigma_d \Sigma_j a_{edj} x_{dj} \leq y_e$ and $f_d \leq b_k \Sigma_j x_{dj} + g_k$ wherein d is the traffic demand (1, 2, ..., D), j is the path (1, 2, ..., m(d)) that can potentially realize demand d, e is the link (1, 2, ..., E), $c_d$ is the weight of demand d, M is a large number, $a_{edj} = 1$ if e belongs to the path j realizing demand d, 0 otherwise, $y_e$ is the capacity of link e, $c_d$ is the weight of demand d, $x_{dj}$ is the flow allocated to path j realizing demand d (non-negative continuous), $f_d$ is a non-negative continuous auxiliary variable associated with demand d, $h_d$ is the lower bound for the allocation to demand d and $H_d$ is the upper bound for the allocation to demand d and $\epsilon_{dj}$ is a binary variable indicating which path is chosen to carry demand d.

21. A computer program embodied on a computer readable medium for optimizing elastic flows in a multi-path network for a given traffic demand, the computer program comprising:

a code segment adapted to jointly determine a bandwidth for each flow in a set of flows that realize the traffic demand and an optimized path for the traffic demand by maximizing a fairness utility, wherein the code segment adapted to jointly determine a bandwidth for each flow in a set of flows that realize the traffic demand and an optimized path for the traffic demand by maximizing a fairness utility comprises:

(a) a code segment adapted to determine an optimal flow for each path;

(b) a code segment adapted to set the capacity of each link;

(c) a code segment adapted to set each total flow allocated to each traffic demand to a total flow allocated to each traffic demand plus a sum of the flows allocated to each path realizing each traffic demand for all paths;

(d) a code segment adapted to set each flow allocated to the path realizing the traffic demand to the flow allocated to the path realizing the traffic demand plus the optimal flow allocated to the path realizing the traffic demand; and (e) a code segment adapted to remove all saturated links and traffic demands that use saturated links, thereby providing optimal path selection and bandwidth allocation for elastic flows in the multi-path network for a given traffic demand.

22. The computer program as recited in claim 21, further comprising:

a code segment adapted to allocate the bandwidth for the traffic demand; and a code segment adapted to assign the optimal path for the traffic demand.

23. The computer program as recited in claim 21, wherein the traffic demand is a specified bandwidth between one or more origin-destination pairs.

24. The computer program as recited in claim 21, wherein the traffic demand is a minimum bandwidth and a maximum bandwidth between one or more origin-destination pairs.

25. The computer program as recited in claim 21, wherein the fairness utility is a maximum-minimum fairness utility.

26. The computer program as recited in claim 21, wherein the fairness utility is a proportional fairness utility.

27. The computer program as recited in claim 21, wherein the optimized path is a single optimized path.

28. The computer program as recited in claim 21, wherein the optimized path is at least two optimized paths.

29. The computer program as recited in claim 21, further comprising a code segment adapted to initialize a total flow allocated to each traffic demand and a flow allocated to each path realizing each traffic demand.

30. The computer program as recited in claim 21, wherein the demand comprises at least two traffic demands and code segments (a) through (e) are performed for each traffic demand.

31. The computer program as recited in claim 21, wherein the code segment adapted to determine an optimal flow for each path comprises a code segment adapted to solve a linear programming problem to maximize C=t using constraints $\Sigma_j x_{dj} = c_d \cdot t$ and $\Sigma_d \Sigma_j a_{edj} x_{dj} \leq y_e$ and $t \geq 0$ wherein d is the traffic demand $(1, 2, \ldots, D)$, j is the path $(1, 2, \ldots, m(d))$ that can potentially realize demand d, e is the link $(1, 2, \ldots, E)$, $a_{edj}=1$ if e belongs to the path j realizing demand d, 0 otherwise, $y_e$ is the capacity of link e, $c_d$ is the weight of demand d, $x_{dj}$ is the flow allocated to path j realizing demand d (non-negative continuous) and t is an auxiliary variable (continuous).

32. The computer program as recited in claim 31, further comprising a code segment adapted to solve a linear programming problem to maximize $C=\Sigma_d c d \Sigma_j x_{dj}$ using constraints $\Sigma_j x_{dj} \geq t_{max}$ and $\Sigma_d \Sigma_j a_{edj} x_{dj} \leq y_e$ wherein d is the traffic demand $(1, 2, \ldots, D)$, j is the path $(1, 2, \ldots, m(d))$ that can potentially realize demand d, e is the link $(1, 2, \ldots, E)$, $a_{edj}=1$ if e belongs to the path j realizing demand d, 0 otherwise, $y_e$ is the capacity of link e, $c_d$ is the weight of demand d, $t_{max}$ is the lower bound for demand realization and $x_{dj}$ is the flow allocated to path j realizing demand d.

33. The computer program as recited in claim 31, wherein a constraint $\Sigma_j x_{dj} = h_d + c_d t$ is used instead of the constraint $\Sigma_j x_{dj} = c_d \cdot t$ during a first determination of the optimal flow wherein hd is the lower bound for the allocation to demand d and the constraint $\Sigma_j x_{dj} = c_d \cdot t$ is used during subsequent determinations of the optimal flow.

34. The computer program as recited in claim 21, wherein the code segment, adapted to jointly determine a bandwidth for each flow in a set of flows that realize the traffic demand and an optimized path for the traffic demand by maximizing a fairness utility, comprises:
 (a) a code segment adapted to determine an optimal flow for each path:
 (b) a code segment adapted to identify a set of all traffic demands in which the path realizing the traffic demand is a saturated link;
 (c) a code segment adapted to set a capacity of each link to the capacity of the link minus the sum of the flows allocated to each path realizing each traffic demand for all paths and traffic demands that the link belongs to if the link is saturated;
 (d) a code segment adapted to, for all traffic demands in the set of traffic demands in which the path realizing the traffic demand contains a saturated link, set each total flow allocated to each traffic demand to a total flow allocated to each traffic demand plus a sum of the flows allocated to each path realizing each traffic demand for all paths;
 (e) a code segment adapted to set each flow allocated to the path realizing the traffic demand to the flow allocated to the path realizing the traffic demand plus the optimal flow allocated to the path realizing the traffic demand; and
 (f) a code segment adapted to remove all saturated links and traffic demands in the set of traffic demands.

35. The computer program as recited in claim 34, further comprising a code segment adapted to initialize a total flow allocated to each traffic demand and a flow allocated to each path realizing each traffic demand.

36. The computer program as recited in claim 34, wherein the demand comprises at least two traffic demands and code segments (a) through (f) are performed for each traffic demand.

37. The computer program as recited in claim 34, wherein the code segment adapted to determine an optimal flow for each path comprises a code segment adapted to solve a linear programming problem to maximize C=t using constraints $\Sigma_j x_{dj} = c_d \cdot t$ and $\Sigma_d \Sigma_j a_{edj} x_{dj} \leq y_e$ and $t \geq 0$ and $\Sigma_j \epsilon_{dj}=1$ and $x_{dj} \leq M \epsilon_{dj}$ wherein d is the traffic demand $(1, 2, \ldots, D)$, j is the path $(1, 2, \ldots, m(d))$ that can potentially realize demand d, e is the link $(1, 2, \ldots, E)$, M is a large number, $a_{edj}=1$ if e belongs to the path j realizing demand d, 0 otherwise, $y_e$ is the capacity of link e, $c_d$ is the weight of demand d, $x_{dj}$ is the flow allocated to path j realizing demand d (non-negative continuous), t is an auxiliary variable (continuous) and $\epsilon_{dj}$ is a binary variable indicating which path is chosen to carry demand d.

38. The computer program as recited in claim 37, wherein a constraint $\Sigma_j x_{dj} = h + c_d t$ is used instead of the constraint $\Sigma_j x_{dj} = c_d \cdot t$ wherein $h_d$ is the lower bound for the allocation to demand d.

39. The computer program as recited in claim 21, wherein the code segment adapted to jointly determine a bandwidth for each flow in a set of flows that realize the traffic demand and an optimized path for the traffic demand by maximizing a fairness utility comprises a code segment adapted to solve a linear programming problem to maximize $C=\Sigma_d c_{dfd}$ using constraints $h_d \leq \Sigma_j x_{dj} \leq H_d$ and $\Sigma_d \Sigma_j a_{edj} x_{dj} \leq y_e$ and $f_d \leq b_k \Sigma_j x_{dj} + g_k$ wherein d is the traffic demand $(1, 2, \ldots, D)$, j is the path $(1, 2, \ldots, m(d))$ that can potentially realize demand d, e is the link $(1, 2, \ldots, E)$, $c_d$ is the weight of demand d, $a_{edj}=1$ if e belongs to the path j realizing demand d, 0 otherwise, $y_e$ is the capacity of link e, $c_d$ is the weight of demand d, $x_{dj}$ is the flow allocated to path j realizing demand d (non-negative continuous), $f_d$ is a non-negative continuous auxiliary variable associated with demand d, $h_d$ is the lower bound for the allocation to demand d and $H_d$ is the upper bound for the allocation to demand d.

40. The computer program as recited in claim 21, wherein the code segment adapted to jointly determine a bandwidth for each flow in a set of flows that realize the traffic demand and an optimized path for the traffic demand by maximizing a fairness utility comprises a code segment adapted to solve a linear programming problem to maximize $C=\Sigma_d c_{dfd}$ using constraints $\Sigma_{j \epsilon dj}=1$ and $x_{dj} \leq M \epsilon_{dj}$ and $h_d \leq \Sigma x_{dj} H_d$ and $\Sigma_d \Sigma_j a_{edj} x_{dj} \leq y_e$ and $f_d \leq b_k \Sigma_j x_{dj} + g_k$ wherein d is the traffic demand $(1, 2, \ldots, D)$, j is the path $(1, 2, \ldots, m(d))$ that can potentially realize demand d, e is the link $(1, 2, \ldots, E)$, $c_d$ is the weight of demand d, M is a large number, $a_{edj}=1$ if e belongs to the path j realizing demand d, 0 otherwise, $y_e$ is the capacity of link e, $c_d$ is the weight of demand d, $x_{dj}$ is the flow allocated to path j realizing demand d (non-negative continuous), $f_d$ is a non-negative continuous auxiliary variable associated with demand d, $h_d$ is the lower bound for the allocation to demand d and $H_d$ is the upper bound for the allocation to demand d and $\epsilon$ dj is a binary variable indicating which path is chosen to carry demand d.

* * * * *

UNITED STATES PATENT AND TRADEMARK OFFICE
CERTIFICATE OF CORRECTION

PATENT NO.      : 7,317,684 B2
APPLICATION NO. : 10/229854
DATED           : January 8, 2008
INVENTOR(S)     : Fodor et al.

It is certified that error appears in the above-identified patent and that said Letters Patent is hereby corrected as shown below:

Column 6, Equation 4, Line 1, delete "$\delta_{ed}y_e \geq z_e - x_d d1, 2, \ldots, D\cdot$" and insert -- $\delta_{ed}y_e \geq z_e - x_d \quad d = 1, 2, \ldots, D;$ --, therefor.

Column 14, Line 34, in Claim 11, delete "$\Sigma_j x_{dj} = c_d \cdot \Sigma_d \Sigma_{dj} a_{edj} x_{dj} \leq y_e$" and insert -- $\Sigma_j x_{dj} = c_d \cdot t$ and $\Sigma_d \Sigma_j a_{edj} x_{dj} \leq y_e$ --, therefor.

Column 15, Line 5, in Claim 14, delete "selling" and insert -- setting --, therefor.

Column 15, Line 36, in Claim 18, delete "$\Sigma_j x_{dj} = h_d - c_{dt}$" and insert -- $\Sigma_j x_{dj} = h_d + c_d t$ --, therefor.

Column 15, Line 48, in Claim 19, after "if" delete "c" and insert -- e --, therefor.

Column 17, Line 23, in Claim 33, after "wherein" delete "hd" and insert -- $h_d$ --, therefor.

Column 18, Line 47, in Claim 40, delete "$\Sigma_{j\epsilon dj}=1$" and insert -- $\Sigma_j \epsilon_{dj}=1$ --, therefor.

Column 18, Line 47, in Claim 40, delete "$h_d \leq \Sigma x_{dj} H_d$" and insert -- $h_d \leq \Sigma_j x_{dj} H_d$ --, therefor.

Signed and Sealed this

Twenty-third Day of November, 2010

David J. Kappos
*Director of the United States Patent and Trademark Office*